(12) United States Patent
Connors et al.

(10) Patent No.: US 7,434,824 B2
(45) Date of Patent: Oct. 14, 2008

(54) AUTOMATIC WHEELCHAIR BRAKE SYSTEM AND WHEELCHAIR INCLUDING SAME

(75) Inventors: James B. Connors, Fayetteville, NY (US); Edward Iles, Liverpool, NY (US); Frank Famulare, Manlius, NY (US); Yuan Jian Li, Chengdu (CN); Morgan Zhang, Fuzhou (CN)

(73) Assignee: Air Movement Technologies, Inc., North Syracuse, NY (US)

( * ) Notice: Subject to any disclaimer, the term of this patent is extended or adjusted under 35 U.S.C. 154(b) by 378 days.

(21) Appl. No.: 10/526,294

(22) PCT Filed: Sep. 3, 2003

(86) PCT No.: PCT/US03/27471

§ 371 (c)(1),
(2), (4) Date: Mar. 1, 2005

(87) PCT Pub. No.: WO2004/022371

PCT Pub. Date: Mar. 18, 2004

(65) Prior Publication Data

US 2006/0011421 A1    Jan. 19, 2006

Related U.S. Application Data

(60) Provisional application No. 60/408,007, filed on Sep. 4, 2002.

(51) Int. Cl.
  *A61G 5/10* (2006.01)
  *B62B 5/04* (2006.01)
  *F16D 65/14* (2006.01)
  *B60T 7/14* (2006.01)

(52) U.S. Cl. .................... 280/304.1; 188/2 F; 188/109; 303/19

(58) Field of Classification Search ............... 188/2 F, 188/5, 109; 280/304.1; 303/19; 297/199, 297/200, 201, 180.16, 362.13
See application file for complete search history.

(56) References Cited

U.S. PATENT DOCUMENTS 1,562,795 A  11/1925  Sauveur
2,426,451 A  8/1947  Hammack (Continued)

FOREIGN PATENT DOCUMENTS

CA        948566 A  *  6/1974

(Continued)

*Primary Examiner*—Lesley D. Morris
*Assistant Examiner*—Daniel Yeagley
(74) *Attorney, Agent, or Firm*—Burr & Brown

(57) ABSTRACT

An automatically engageable and releasable brake apparatus adaptable to be attached to a wheelchair is provided, including a connection mechanism adapted to be positioned on a rear frame portion of the wheelchair frame, a seat actuation member adapted to be positioned on the wheelchair seat, a brake actuating member coupled to the connection mechanism and in fluid communication with the seat actuation member defining a closed fluid system therewith, and a brake member coupled to the brake actuating member and adapted to contact a ground surface on which the wheelchair is located. Occupational ingress into the wheelchair causes fluid to flow from the seat actuation member to the brake actuating member, which causes the brake member to move from a first position in substantial contact with the ground surface on which the wheelchair is located to a second position spaced a distance above the ground surface.

16 Claims, 9 Drawing Sheets

U.S. PATENT DOCUMENTS

| | | | | |
|---|---|---|---|---|
| 2,753,919 A | * | 7/1956 | Sill | 188/27 |
| 2,886,139 A | * | 5/1959 | Wilson | 188/5 |
| 3,211,250 A | * | 10/1965 | Wood | 180/273 |
| 3,280,933 A | * | 10/1966 | Jones | 180/253 |
| 3,288,250 A | * | 11/1966 | Oja et al. | 188/5 |
| 3,360,305 A | * | 12/1967 | Ryskamp | 303/19 |
| 3,529,700 A | | 9/1970 | Marshall | |
| 3,653,724 A | * | 4/1972 | Smith | 303/19 |
| 3,716,116 A | * | 2/1973 | Von Seggern | 188/109 |
| 3,903,513 A | * | 9/1975 | Green et al. | 340/457.3 |
| 4,320,818 A | | 3/1982 | Knoche | |
| 4,350,227 A | | 9/1982 | Knoche | |
| 4,384,732 A | | 5/1983 | Wierwille | |
| 4,570,756 A | | 2/1986 | Minnebraker et al. | |
| 4,614,246 A | * | 9/1986 | Masse et al. | 180/6.5 |
| 4,623,043 A | | 11/1986 | Babilas | |
| 4,773,494 A | | 9/1988 | Anderson | |
| 4,852,697 A | | 8/1989 | Kulik | |
| 5,513,867 A | | 5/1996 | Bloswick et al. | |
| 6,092,824 A | | 7/2000 | Ritchie et al. | |
| 6,279,936 B1 | | 8/2001 | Ritchie et al. | |
| 6,347,688 B1 | | 2/2002 | Hall et al. | |
| 6,371,503 B2 | | 4/2002 | Ritchie et al. | |
| 6,454,285 B1 | * | 9/2002 | Koenig | 280/250.1 |
| 6,688,437 B2 | | 2/2004 | Usherovich | |
| 6,739,610 B2 | * | 5/2004 | Connors et al. | 280/304.1 |
| 6,863,293 B2 | * | 3/2005 | Kimura et al. | 280/304.1 |
| 2002/0149168 A1 | | 10/2002 | Brown | |
| 2003/0098568 A1 | | 5/2003 | Keppler | |
| 2005/0087954 A1 | * | 4/2005 | Wakita et al. | 280/304.1 |

FOREIGN PATENT DOCUMENTS

| | | |
|---|---|---|
| WO | 90/14064 | 11/1990 |

* cited by examiner

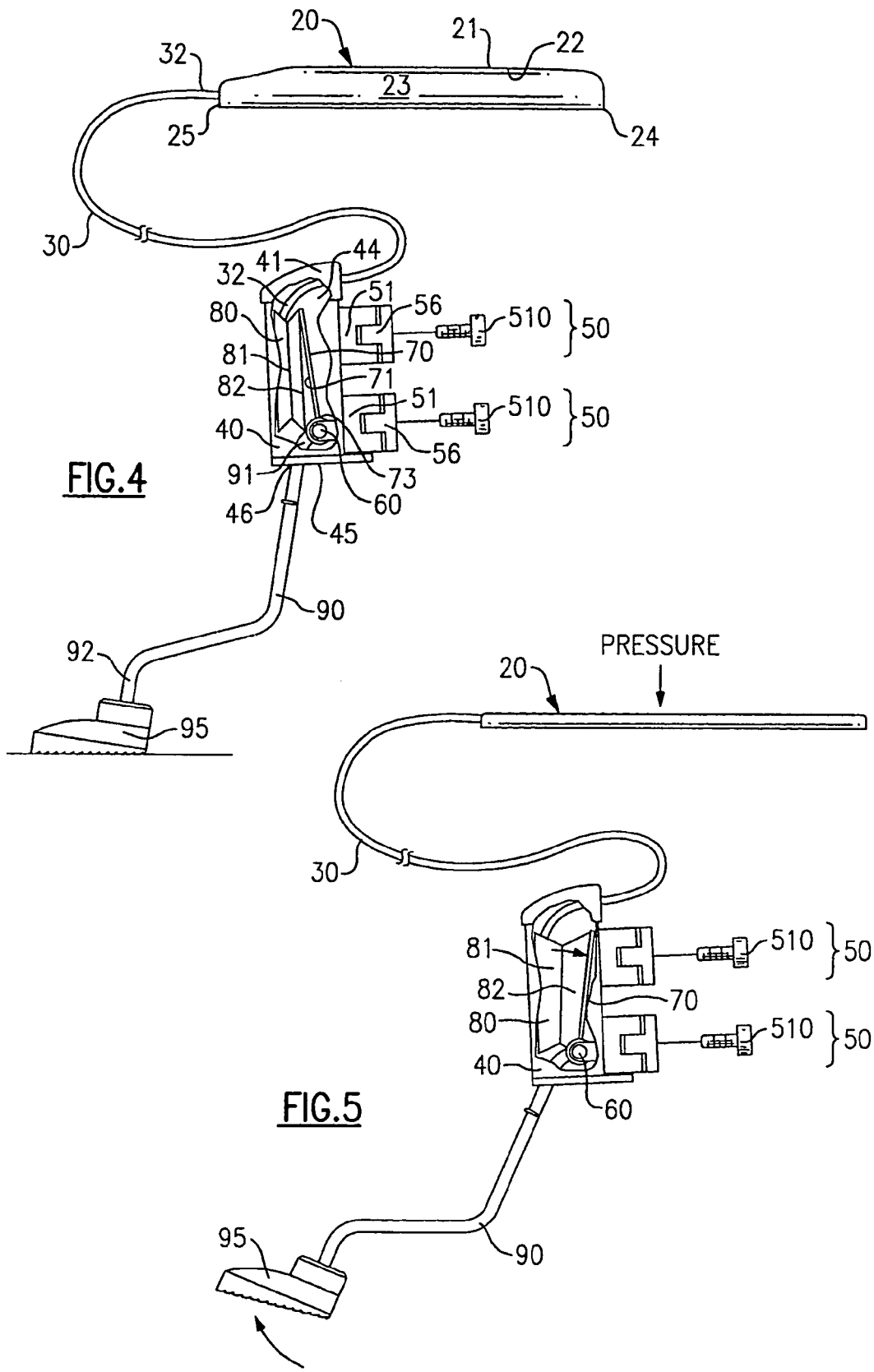

AUTOMATIC WHEELCHAIR BRAKE SYSTEM AND WHEELCHAIR INCLUDING SAME

BACKGROUND OF THE INVENTION

The present invention relates to an automatic wheelchair brake system for preventing unwanted rearward movement of a wheelchair during an occupant's transitional ingress and egress, and more particularly to a wheelchair having a brake apparatus that automatically releases when a patient is properly seated.

Using a wheelchair enables patients suffering from various physical and mental disabilities to engage in some level of activity without experiencing the pain or limitations ordinarily placed upon them, and many patients who use wheelchairs are not permanently confined thereto. For these patients, the wheelchair is a convenient tool to facilitate mobility that is not possible otherwise. But often, getting in and out of the wheelchair can pose a problem for such users, in that the chair may roll backward unexpectedly as the patient transitions from standing to sitting, and vice versa. It is especially important that the wheelchair remains stationary during this period, since the natural motion associated with transitioning from sitting to standing, and vice versa, tends to transmit a rearward force on the wheelchair. Further, because only a minimal force is required to move the wheelchair backwards rather rapidly, the patient is extremely vulnerable to falling injuries during this transition period.

In the past, various attempts to prevent such unwanted movement involved installing a braking mechanism on the wheelchair. In fact, most wheelchairs incorporate some type of brake to stabilize the wheelchair in a stationary position by preventing rotation of the rear wheels. Conventional wheelchairs, which are foldable for storage, are invariably fitted with hand-operated brakes. These brakes engage the main drive wheels of the wheelchair, and are applied by a user (primary), or an assistant (secondary user), to stabilize the wheelchair before the primary user is seated. Once seated, the user releases the brakes by hand to again permit wheelchair mobility, and when the user wishes to leave the wheelchair, the brakes are re-applied.

Brakes of this conventional type are adequate when the user is not seriously physically handicapped and when the user is in substantial control of his mental faculties. However, when the user is severely handicapped or otherwise unable to operate the hand brake, manual brakes are quite inadequate. An unaided user who attempts to enter or exit a wheelchair that is not locked in a stationary position is faced with a difficult and dangerous task.

One of the most widely used devices for stopping and securing the wheelchair is a brake similar to that shown in U.S. Pat. No. 4,570,756 to Minnebraker et al., in which a lever arm is provided to urge a braking member into contact with the tread of the wheelchair tire. However, despite its popularity, this brake causes unnecessary tire tread wear, lacks substantial holding efficiency on sloped surfaces, and becomes almost unusable when the tire is wet. Since the device is only applied to one wheel, applying stopping action on both wheels of the wheelchair requires installation of two devices that must be engaged using two hands, which may not be an available option for a particular patient.

Similar wheelchair brakes are also disclosed in U.S. Pat. No. 3,529,700 to Marshall; U.S. Pat. No. 2,426,451 to Hammack; U.S. Pat. No. 4,384,732 to Wierwille; U.S. Pat. No. 4,852,697 to Kulik; and U.S. Pat. No. 4,350,227 to Knoche. All of these disclose braking devices for wheelchairs wherein braking pressure is applied directly to the tire rather than to the wheel rim.

Because of the above problems typically associated with prior wheelchair brakes, attempts have been made to provide an alternative brake system, which automatically remains braked while the wheelchair is unoccupied, and which releases automatically under the weight of the user when properly seated.

For example, U.S. Pat. No. 4,623,043 to Babilas discloses an automatic wheelchair brake that automatically locks both wheels when a patient attempts to rise from the wheelchair. While seated, the patient can manually operate a three-way lever brake having a manual-locked, a manual-unlocked and an automatic position. If the patient attempts to rise while the brake lever is in the manually unlocked position, the lever automatically returns to the automatic position and both wheels still lock automatically. After the patient has exited, the wheelchair may only be moved by shifting the operating lever to the manual unlock position. However, the threat of rollback remains after the wheelchair is freely repositioned, especially if an unaided patient forgets to re-engage the manual-lock before sitting, or another unaware patient attempts to sit in the unbraked wheelchair. Thus, despite the automatic engagement feature, the manual nature of this brake is not generally desirable for seriously impaired patients.

Another wheelchair having an automatically engaging braking system is disclosed in U.S. Pat. No. 3,529,700 to Marshall, and uses chains or rod linkages connected between a set of rigid actuating bars attached to the seat panel to operate a pair of transverse brake levers which engage the main wheels. U.S. Pat. No. 4,320,818 to Knoche discloses a wheelchair brake assembly for use with a conventional foldable wheelchair that provides a pair of rearwardly extending brake arms connected to adjacent side frames underneath the seat. Each brake arm includes a transverse forward portion pivoted to the side frame and has a brake shoe in biased engagement with a drive wheel. The rearward portion of each brake arm is provided with a post engageable by the wheelchair seat to pivot the brake shoe out of engagement with the wheel when the seat is depressed and moved downwardly by the weight of an occupant. The wheelchair side frames are connected by a tension spring to ensure that the brake is engaged when the wheelchair is unoccupied.

Yet another prior art wheelchair brake is the anti-rollback assembly of U.S. Pat. No. 6,092,824 to Ritchie. The one-way brake assembly is shown in FIGS. 13 and 14 as an example of a prior art wheelchair brake that automatically immobilizes the wheelchair against rearward movement when the occupant attempts to rise.

More specifically, FIG. 13 shows a wheelchair 1 having a frame 2 and an anti-rollback assembly. The anti-rollback assembly includes fastening devices 3A and 3B attached to opposing portions 2A and 2B of the frame 2 above the point where the opposing axles 4A and 4B intersect the frame 2. The fastening devices 3A and 3B include a large number of individual components as shown in FIG. 14, but the rotatable connection members 3*a* and 3*b* are most noteworthy for purposes of this discussion. A rigid crossbar 6A is rotatably attached to and interposed between the rotatable connection members 3*a* and 3*b* such that the rigid crossbar 6A transversely connects the fastening members 3A and 3B over the horizontal distance spanning between the two opposing sides 2A and 2B of the frame 2. The rigid cross bar 6A includes an arm 6B having a first portion 6*a* perpendicularly extending from the horizontal rigid crossbar 6A and joining with a second portion 6b at an elbow. The second portion 6b extends vertically upward from the elbow such that a third portion 6c is positioned under the wheelchair seat 7. A pair of brake arms 5A and 5B are rigidly attached to the rotatable connection members 3a and 3b and positioned to contact the rear wheels 20A and 20B such that the rear wheels are not moveable. When a patient sits on the wheelchair seat 7, the third portion 6c of the arm 6B is pressed downward, causing the rigid crossbar 6A to rotate in a rearward direction. The brake arms 5A and 5B lift upward in co-rotation with the rigid crossbar 6A and out of contact with the rear wheels 20A and 20B which are then freely moveable.

Another prior art wheelchair brake assembly is the wheelchair rollback stop of U.S. Pat. No. 6,347,688 to Hall et al. The device of Hall et al. includes a multi-part lever mechanism consisting of two levers that are attached to a wheelchair via an elongated (modified) axle bolt that acts as a fulcrum. The multi-part lever mechanism is activated (i.e., a plurality of posts with cane ends are pressed against the ground) when no patient is seated on the seat of the wheelchair, and deactivated when a patient's weight depresses the wheelchair seat. The design of the multi-part lever mechanism involves a large number of individual components that must be assembled and adjusted to ensure that the rollback stop performs properly. For example, an unmodified wheelchair (i.e., a wheelchair having a standard axle bolt) must be modified, that is, the standard axle bolt must be removed and replaced with the elongated axle bolt mentioned above. In most cases, when the wheel axle bolt is removed from the wheelchair, the wheel requires substantial bracing to avoid complete removal, due to the fact that the removed axle bolt can no longer secure the wheel to the wheelchair. In that manner, to modify a wheelchair to accommodate the rollback stop of Hall et al., replacing an existing axle bolt is no small task. Once fitted with a suitable (i.e., elongated) axle bolt, the remainder of the multi-part lever mechanism must be attached and adjusted using a plurality of pins, springs, bolts, and set-screws. Ultimately, installation is time consuming and complex.

Although automatic brakes, in general, offer advantages over manual brakes, room for improvement remains. Particularly, one problem is that the above mentioned automatic wheelchair brakes include a multitude of small parts which must be precisely adjusted to work in concert to accomplish the desired effect. Many people who are responsible for wheelchair operation and maintenance are thus hesitant to tackle such complex installation of multi-component brakes.

Portability and storage of unoccupied wheelchairs are also hindered by complex automatic brake assemblies that usually brace the frame of the wheelchair in a transverse manner. Once automatic brakes having these rigid crossbars are installed, the brakes must be at least partially uninstalled (i.e., removed) to store, transport, or otherwise collapse the unoccupied wheelchair. Given the complex nature of the multiple-component assemblies, foldable storage and transport is not easily facilitated.

Another common problem among automatic wheelchair brake mechanisms is that the safety feature itself compromises the comfort of the user. This is prevalent among automatic wheelchair brakes that involve some type of seat-activation that is directly connected to the actual brake member, such as those described above. Because applying the patient's weight to the seat activates the automatic brake to disengage, and since the brake automatically engages upon removal of that weight, the brake member beneath the seat exerts a significant upward force on the seat. Thus, patients seated in thusly equipped flexible wheelchair seats often experience discomfort or pain due to the presence of the brake activation member pushing up on the seat. Even if the amount of upward force exerted by the brake mechanism positioned immediately beneath the seat is minimal, patients' perceptions remain that the brake mechanism involves a lump of some sort on which the patient is forced to sit. This can be annoying for any patient, but can pose particularly serious problems, such as skin deterioration, for those who spend a considerable amount of time in the wheelchair.

Thus, it would be desirable to provide a wheelchair having a brake assembly that overcomes the drawbacks of the prior art. It would be particularly desirable to provide a cost effective wheelchair brake apparatus capable of automatic activation and release by an occupant, having few components to facilitate easy installation, having a nonrestrictive assembled structure to facilitate easy storage, and having a comfortable and efficient means of preventing unwanted motion of an empty wheelchair while users transition from a sitting position to a standing position, or vice versa.

SUMMARY OF THE INVENTION

It is an object of the present invention to overcome the drawbacks in the prior art, particularly to provide an automatically engageable and releasable wheelchair brake having few components to facilitate easy installation, having a nonrestrictive installed structure to facilitate easy folding and storage, and having a comfortable and effective means of preventing unwanted motion, such as rollback, of the wheelchair especially while users transition from a sitting position to a standing position, or vice versa.

According to one embodiment of the present invention, an automatically engageable and releasable brake apparatus adaptable to be attached to a wheelchair is provided. The brake apparatus includes a connection mechanism adapted to be positioned directly on a portion of the wheelchair frame proximate a rear wheel of the wheelchair, a seat actuation member adapted to be positioned on a surface of the wheelchair seat, and a brake actuating member in fluid communication with the seat actuation member defining a closed fluid system therewith. The brake actuating member is coupled to the connection mechanism and further includes a brake member adapted to contact the ground surface on which the wheelchair is located. The brake member is coupled to the brake actuating member such that occupational ingress into the wheelchair i.e., when a person assumes a seated position in the wheelchair seat or an object is placed thereon, actuates the seat actuation member. Fluid is transferred from the seat actuation member to the brake actuating member to thus actuate the brake actuating member. This, in turn, causes the brake member to move from a first position in substantial contact with the ground surface on which the wheelchair is located to a second position spaced a distance above the ground surface.

Furthermore, occupational egress, i.e., when a user or an object vacates the wheelchair seat, essentially deactivates the seat actuation member, which in turn deactivates the brake actuating member and causes the brake member to move from the second position spaced a distance above the ground surface to the first position in substantial contact with the ground surface. Thus, when the wheelchair seat is occupied upon ingress, the brake member is in the second position, which permits uninhibited rearward motion of the wheelchair and allows the wheelchair to move both forward and backward at the user's discretion. When the wheelchair seat is vacated upon egress, the brake member assumes the first position in contact with the ground surface, which stabilizes the wheelchair and prevents rearward motion.

The present invention addresses and solves the need for an automatic brake that does not require physical manipulation on the part of a user to engage or disengage. Further, the brake apparatus of the present invention is activated by the natural functions associated with wheelchair use, i.e., sitting in the seat and leaving the seat. Moreover, the seat actuation member on which an occupant sits is not in physical contact with the actual brake mechanism, but, rather, activates the brake by fluid transfer, which is hardly noticeable to the user. The seat actuation member is actually cushion-like and provides a comfortable sitting experience. In fact, the compressible nature of the fluid-filled seat actuation member can actually enhance the overall comfort of the wheelchair seat.

The brake member can include a brake shaft member in communication with the brake actuating member. Preferably, the brake shaft member extends from a first end thereof to an opposed second end thereof and is positioned to extend substantially downwardly from a portion of the connection mechanism. The brake member can further include a friction member positioned proximate the second end of the brake shaft member and adapted to contact a surface on which the wheelchair is located. The connection mechanism includes an external surface and an internal surface opposing the external surface and defining a substantially enclosed chamber. It is also preferred that the connection mechanism is positioned on the wheelchair frame at a location beneath the axle of the rear wheel.

The seat actuation member preferably includes a first fluid cell having a first volume, and the brake actuating member preferably includes a second fluid cell having a second volume. The first fluid cell is in fluid communication with the second fluid cell via a conduit having a third volume, and the first fluid cell, the second fluid cell and the conduit together define the closed fluid system, containing a fluid, such as air, therein.

It is also preferred that the brake actuating member further includes a pivot member having a pivot axis, and a plate member attached to the pivot member. Preferably, the pivot member is rotatably coupled to at least one inner surface of the connection mechanism. It is also preferred that the second fluid cell is positioned within the connection mechanism between a surface of the plate member and a portion of the internal surface of the connection mechanism.

Moreover, it is preferred that the first end of the brake shaft member is coupled to a portion of the pivot member such that the plate member and the brake shaft member rotate about the pivot member in concert. The brake actuating member can also include at least one biasing member operatively coupled to the pivot member to bias the pivot member in a first rotation direction toward the first position, so that the friction member remains in contact with the ground surface, and the wheelchair remains braked while the wheelchair is unoccupied and during occupational ingress and egress thereof.

The first fluid cell can include a plurality of fluid chambers in fluid communication with one another, which can be arranged in juxtaposition. Further, the second fluid cell can also include a plurality of fluid chambers in fluid communication with one another, which can be stacked one upon another, or the second fluid cell can include a single, flexible fluid chamber foldably arranged generally in the shape of bellows.

The connection mechanism preferably includes at least one attachment member, more preferably two attachment members, positioned on a portion of the external surface thereof and adapted to couple the connection mechanism to the frame of the wheelchair. Preferably, the attachment members are swivel hinge clamps. Each swivel hinge clamp preferably includes a first clamp member having a hinged side, an opposed non-hinged side, a front surface and a back surface, with the back surface of the first clamp member being fixedly fastened to the external surface of the connection mechanism. The swivel hinge clamp further includes a second clamp member having a hinged side, an opposed non-hinged side, a front surface and a back surface. The second clamp member is positioned such that the back surface of the second clamp member opposes the front surface of the first clamp member, and the non-hinged sides of the first and the second clamp members oppose one another. A swivel member is also included, joining the hinged sides of the first and the second clamp members to one another. A closure member is preferably positioned proximate the non-hinged sides of the first and the second clamp members to secure the clamp.

It is preferred that the connection mechanism and brake shaft member comprise an integral unit that is preassembled, such that proper installation of the entire brake apparatus requires little more than an Allen-head wrench and a few turns of a fastener. That is, complete installation simply involves (1) positioning the attachment members of the connection mechanism about a portion of the rear wheelchair frame such that the friction member extending therefrom is in the first position; (2) tightening the closure member with an Allen-head wrench, for example, to secure the attachment members and affix the connection mechanism to the wheelchair frame; and (3) placing the seat actuation member on the wheelchair seat.

The compressible and flexible seat actuation member is foldable, and can substantially conform to the folded wheelchair seat. As such, the seat actuation member does not inhibit the collapsibility of the wheelchair, and since the brake apparatus does not include any transverse bracing members, foldable storage and transport of the equipped wheelchair are possible.

The brake apparatus can also include a pressure regulating member for adjusting an internal pressure of the closed fluid system, such as a bulb having a one-way check valve. The pressure regulating member can be positioned on a portion of the conduit that provides fluid communication between the seat actuation member and the brake actuating member. The conduit can be a flexible tube capable of containing the fluid and maintaining the closed fluid system between the first and second fluid cells. The seat actuation member can also include an electric pressure sensor to determine the presence of an occupant in the wheelchair.

According to another embodiment of the present invention, an automatically engageable and releasable brake apparatus adaptable to be attached to a wheelchair is provided. The brake apparatus includes a connection mechanism adapted to be attached directly to a portion of the frame of the wheelchair proximate a rear wheel of the wheelchair, a seat actuation member adapted to be positioned on a surface of the wheelchair seat, and a brake actuating member in fluid communication with the seat actuation member and defining a closed fluid system therewith. The brake apparatus also includes a brake shaft member in communication with the brake actuating member. The brake shaft member extends from a first end to an opposed second end thereof, and is positioned to extend substantially downwardly from a portion of the connection mechanism proximate the first end of the brake shaft member. A friction member positioned proximate the second end of the brake shaft member and adapted to contact a surface on which the wheelchair is located is also included.

Occupational ingress into the wheelchair, as defined above, causes fluid to flow from the seat actuation member to the brake actuating member, which in turn causes the brake shaft member to move such that the friction member substantially contemporaneously moves from a first position in substantial contact with the surface on which the wheelchair is located to a second position spaced a distance above the surface on which the wheelchair is located. Furthermore, occupational egress, i.e., when a user or an object vacates the wheelchair seat, essentially deactivates the seat actuation member, which causes fluid to flow from the brake actuating member back to the seat actuation member. This in turn deactivates the brake actuating member and causes the brake member to move from the second position spaced a distance above the ground surface to the first position in substantial contact with the ground surface.

According to another embodiment of the present invention, an automatically engageable and releasable brake apparatus adaptable to be attached to a wheelchair is provided, including a connection mechanism adapted to be attached directly to a portion of the wheelchair frame proximate a rear wheel of the wheelchair. The connection mechanism includes an external surface and an internal surface defining a substantially enclosed chamber. The brake apparatus further includes a seat actuation member comprising a first fluid cell having a volume adapted to be positioned on a surface of the wheelchair seat, and a brake actuating apparatus positioned within the chamber of the connection mechanism. The brake actuating apparatus includes a second fluid cell, having a second volume, which is in fluid communication with the first fluid cell via a conduit having a third volume. The first fluid cell, the second fluid cell and the conduit together define a closed fluid system having a total volume. A fluid contained within the closed system is also provided. The brake actuating apparatus further includes a pivot member rotatably coupled to the internal surface of the connection mechanism, a plate member positioned adjacent the second fluid cell and substantially fixedly coupled to the pivot member, a brake shaft member extending longitudinally from a first end to a second end thereof and positioned to extend substantially downwardly from a portion of the connection mechanism proximate the first end of the brake shaft member. The first end of the brake shaft member is substantially fixedly coupled to the pivot member. The brake actuating apparatus further includes a friction member positioned proximate the second end of the brake shaft member and adapted to contact a surface on which the wheelchair is located.

According to the above embodiment, occupational ingress of the wheelchair causes an increase in pressure within the first fluid cell, which causes a displaced volume of fluid in the first fluid cell to translocate to the second fluid cell. This in turn increases the volume of fluid in the second fluid cell and causes the second fluid cell to expand. This causes the plate member to rotate about the pivot member and the brake shaft member to rotate and move the friction member from the first position to a second position spaced a distance above the surface on which the wheelchair is located.

According to another embodiment of the present invention, an automatically engageable and releasable brake apparatus adaptable to be attached to a wheelchair is provided and includes a seat actuation member, a brake actuating member in fluid communication with the seat actuation member and defining a closed fluid system therewith, and a brake member in communication with the brake actuating member. Actuation of the seat actuation member activates the brake actuating member and causes the brake member to move from a first position, which prevents any significant rearward motion of the wheelchair, to a second position which allows substantially unrestricted rearward motion of the wheelchair.

According to another embodiment of the present invention, a wheelchair is provided, including a frame, a seat member incorporated into and substantially supported by the frame, a wheel assembly having a plurality of first wheels rotatably connected proximate a front end of the frame, and a plurality of second wheels rotatably connected proximate a rear portion of the frame, and an automatically engageable and releasable brake apparatus attached to the rear portion of the frame. The brake apparatus includes a connection mechanism attached to the rear portion of the frame, a seat actuation member positioned on a surface of the seat member, and a brake actuating member coupled to the connection mechanism and in fluid communication with the seat actuation member defining a closed fluid system therewith. The brake apparatus further includes a brake member adapted to contact a ground surface on which the wheelchair is, located and coupled to the brake actuating member such that occupational ingress into the wheelchair actuates the seat actuation member, which causes fluid to flow from the seat actuation member to the brake actuating member. This in turn causes the brake member to move from a first position in substantial contact with the ground surface on which the wheelchair is located to a second position spaced a distance above the ground surface.

According to another embodiment of the present invention, a wheelchair is provided, including a frame, a seat member incorporated into and substantially supported by the frame, a wheel assembly having a plurality of first wheels rotatably connected proximate a front end of the frame, and a plurality of second wheels rotatably connected proximate a rear portion of the frame, and an automatically engageable and releasable brake apparatus attached to the rear portion of the frame. The brake apparatus includes a connection mechanism attached to the rear portion of the frame, a seat actuation member positioned on a surface of the seat member, and a brake actuating member in fluid communication with the seat actuation member and defining a closed fluid system therewith. A brake shaft member in communication with the brake actuating member is also provided. The brake shaft member extends from a first end thereof to an opposed second end thereof, and is positioned to extend substantially downwardly from a portion of the connection mechanism proximate the first end of the shaft member. A friction member positioned proximate the second end of the brake shaft member and adapted to contact a surface on which the wheelchair is located is also provided. Occupational ingress into the wheelchair actuates the seat actuation member and the brake actuating member in the same manner as described above, which in turn causes the brake shaft member to move such that the friction member substantially contemporaneously moves from a first position in substantial contact with the surface on which the wheelchair is located to a second position spaced a distance above the surface on which the wheelchair is located.

According to yet another embodiment of the present invention, a wheelchair including a frame, a seat member incorporated into and substantially supported by the frame, a wheel assembly having a plurality of first wheels rotatably connected proximate a front end of the frame, and a plurality of second wheels rotatably connected proximate a rear portion of the frame, and an automatically engageable and releasable brake apparatus attached to the rear portion of the frame is provided. The brake apparatus includes a connection mechanism having an external surface and an internal surface defining a substantially enclosed chamber, a seat actuation member positioned on a surface of the seat member and including a first fluid cell having a volume, and a brake actuating apparatus positioned within the chamber of the connection mechanism. The brake actuating apparatus includes a second fluid cell having a second volume and in fluid communication with the first fluid cell via a conduit having a third volume. Together, the first fluid cell, the second fluid cell and the conduit define a closed fluid system having a total volume. A fluid having a fourth volume is provided and contained within the closed system. A pivot member rotatably coupled to the internal surface of the connection mechanism is also provided, along with a plate member positioned adjacent the second fluid cell. The plate member has a first surface and an opposed second surface and extends longitudinally from a first end to an opposed second end, and is substantially fixedly coupled to the pivot member. A brake shaft member extending longitudinally from a first end to a second end thereof and positioned to extend substantially downwardly from a portion of the connection mechanism proximate the first end of the brake shaft member is also provided. The first end of the brake shaft member is substantially fixedly coupled to the pivot member. Further, a friction member positioned proximate the second end of the brake shaft member and adapted to contact a surface on which the wheelchair is located is included. Occupational ingress into the wheelchair causes an increase in pressure within the first fluid cell, which causes a displaced volume of fluid in the first fluid cell to translocate to the second fluid cell, which in turn increases the volume of fluid in the second fluid cell and causes the second fluid cell to expand, which in turn causes the plate member to rotate about the pivot member and cause the brake shaft member to rotate and move the friction member from a first position in substantial contact with the surface on which the wheelchair is located to a second position spaced a distance above the surface on which the wheelchair is located.

According to another embodiment of the present invention, a wheelchair is provided, including a frame, a seat member incorporated into and substantially supported by the frame, a wheel assembly having a plurality of first wheels rotatably connected proximate a front end of the frame, and a plurality of second wheels rotatably connected proximate a rear portion of the frame, and an automatically engageable and releasable brake apparatus attached to the rear portion of the frame. The brake apparatus includes a seat actuation member, a brake actuating member in fluid communication with the seat actuation member and defining a closed fluid system therewith, and a brake member in communication with the brake actuating member. Actuation of the seat actuation member activates the brake actuating member in the same manner as described above. This causes the brake member to move from a first position which prevents any significant rearward motion of the wheelchair to a second position which allows substantially unrestricted rearward motion of the wheelchair.

BRIEF DESCRIPTION OF THE DRAWINGS

For a better understanding of the nature and objects of the invention, reference should be made to the following detailed description of a preferred mode of practicing the invention, read in connection with the accompanying drawings, in which:

FIG. 4 is a partial cut-away side view of an engaged mode of the brake apparatus of the present invention adaptable to be attached to the right hand side of the wheel chair as shown in FIG. 1;

FIG. 5 is a is a partial cut-away side view of a disengaged mode of the brake apparatus of the present invention shown in FIG. 4;

DETAILED DESCRIPTION OF THE INVENTION

Figure 1:
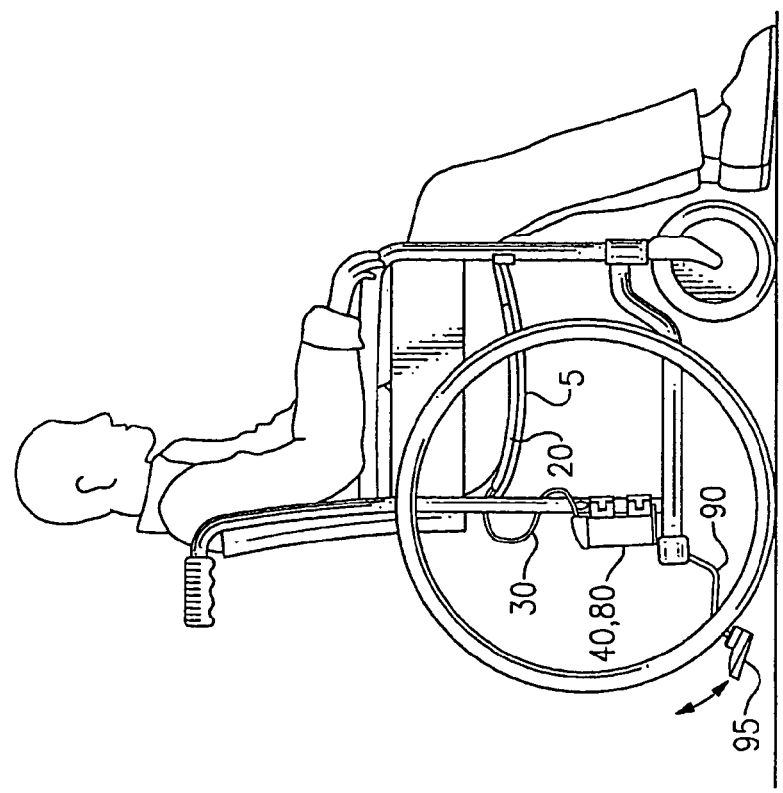
FIG. 1 is a is a side view showing a wheelchair and an engaged mode of the brake apparatus according to one embodiment of the present invention.

FIG. 1 is a side view of a wheelchair and an engaged mode of a brake apparatus according to one embodiment of the present invention, specifically shown as an occupant attempts to sit on the seat member 5 of the wheelchair 1. The brake apparatus of this embodiment includes a compressible seat actuation member 20 positioned on the seat member 5, which is coupled with a brake actuating member 80 via a conduit 30 to comprise a closed fluid system. The brake actuating member 80 is housed within a connection mechanism 40, which is affixed to the wheelchair 1 at a rear portion of the frame 2 via integrated attachment members 50, 50 and vertically spaced a distance below the axle 3 of rear wheel 7.

The brake apparatus further includes a brake shaft member 90 extending downwardly from a first end 91 proximate the connection mechanism 40 toward an opposed second end 92. A friction member 95 is also included proximate the second end 92 of the brake shaft member 90, and positioned to be in substantial contact with the ground surface on which the wheelchair 1 is located. In this engaged state, rearward motion of the wheelchair is restricted by the braced friction member 95, and rearward force applied by the occupant as he attempts to sit down on the seat member 5 does not cause backward movement of the unoccupied wheelchair 1.

The friction member 95 is a replaceable part, and as such, is equipped with a separate fastening means (not shown) to secure the friction member 95 to the brake shaft member 90. The fastening means is loosened to remove a worn friction member 95, and retightened to secure a new replacement friction member 95.

The brake shaft member 90 must be sufficiently long to provide a firm contact between the friction member 95, and the ground surface. In that manner, the friction member 95 engages the ground surface on which the wheelchair 1 is sitting at an angle to effectively brace the brake shaft member 90 between the connection mechanism 40 and the ground surface. The position of the connection mechanism 40 on the rear frame 2 can be easily adjusted by loosening and vertically repositioning the attachment members 50, 50 (i.e., sliding the unit up or down) to achieve the desired positioning of the friction member 95.

Figure 2:
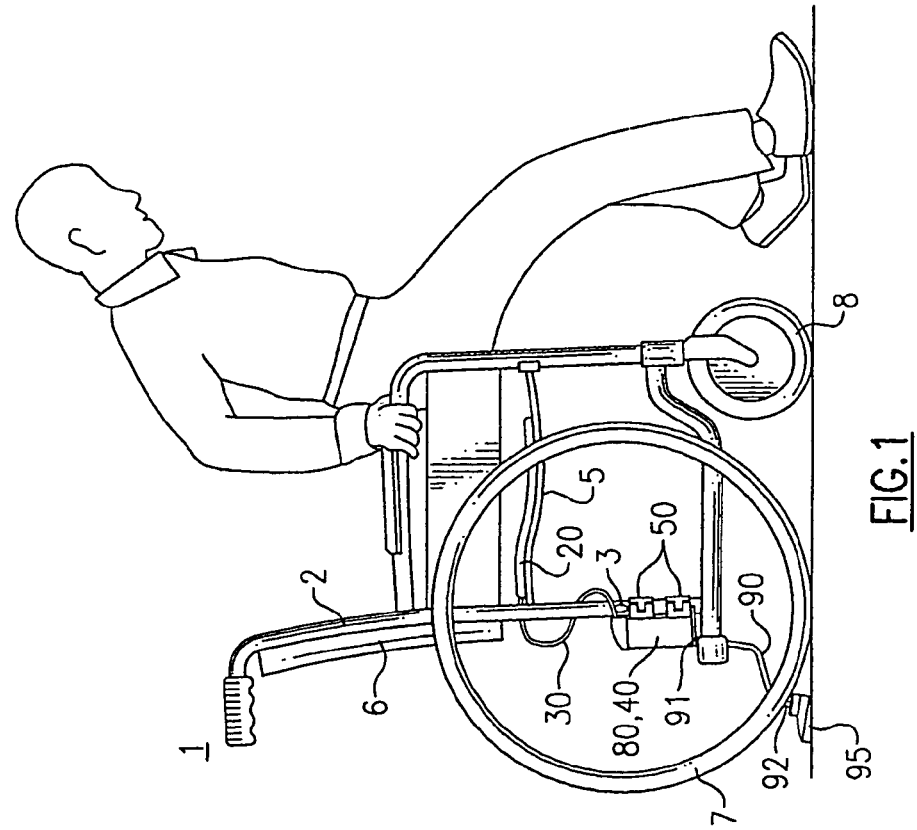
FIG. 2 is a side view showing the wheelchair and a disengaged mode of the brake apparatus of FIG. 1.

FIG. 2 is a side view of an embodiment of the present invention corresponding to FIG. 1, shown after the brake apparatus is disengaged by occupational ingress, that is, when a standing occupant transitions to a seated position on the seat member 5. In the ordinary course of occupational ingress, the transitioning occupant applies a pressure force proportional to the mass of the occupant and the speed of ingress on the seat member 5. A main component of this pressure force is applied in a substantially downward direction generally perpendicular to the horizontal plane of the seat member 5 and the seat actuation member 20, which causes the seat actuation member 20 to deform, i.e., compress downwardly.

As the seat actuation member 20 is deformed under the weight of the seated occupant, or under the weight of an object which has been similarly placed on the seat member 5, the brake actuating member 80 positioned within the connection mechanism 40 substantially contemporaneously actuates the brake shaft member 90. The brake shaft member 90 moves (lifts) in a generally upward and outward direction along a predetermined arc path such that the friction member 95 in the first position, i.e., in bracing contact with the ground surface on which the wheelchair 1 is sitting, moves to a new (second) position in a generally upward and outward direction along the same arc path as the brake shaft member 90. In that manner, the friction member 95 assumes the second position spaced a distance above the ground surface on which the wheelchair 1 is sitting, and the brake apparatus is disengaged. Thus, the wheelchair 1 can be moved backward if so desired by the seated occupant.

Figure 3:
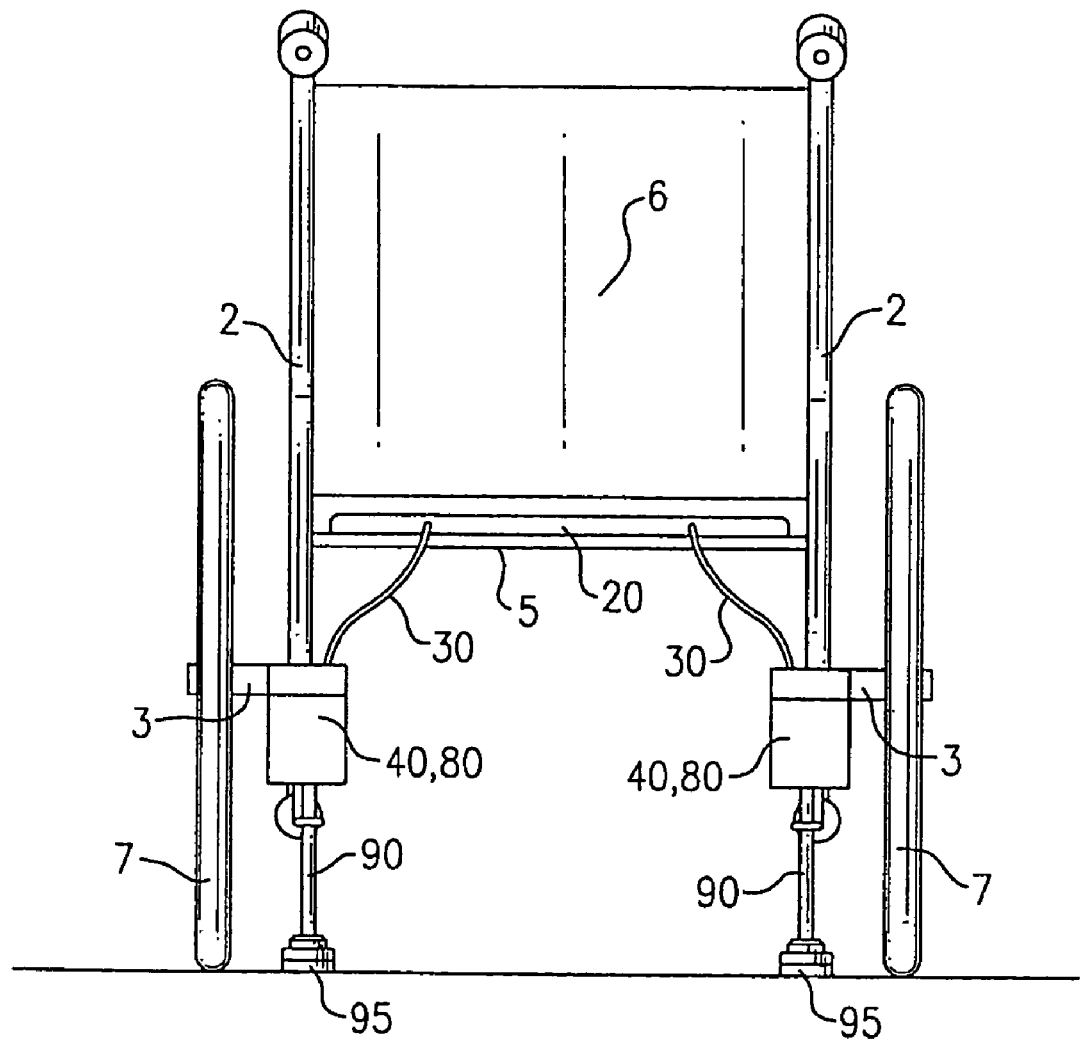
FIG. 3 is a back view of a wheelchair having a brake apparatus according to one embodiment of the present invention.

Although the above views are two dimensional, it should be understood that, three dimensionally, the wheelchair 1 preferably includes two parallel sets of front wheels 8 and rear wheels 7, two laterally opposed axles 3 and two parallel sides of the wheelchair frame 2. Further, it should be understood that the brake apparatus of the present invention can be positioned and operated as described above with respect to the parallel side not represented in FIGS. 1 and 2. According to a preferred mode of the present invention, and as shown in FIG. 3, the brake apparatus described above is installed on both sides of the rear frame 2 proximate each rear wheel axle 3 to further prevent any sudden, radial or pivotally-rearward movement about a singularly braced brake shaft member upon occupational ingress or egress.

FIG. 4 is an enlarged, partial cut-away side-view of the engaged mode of the brake apparatus shown attached to the right-hand side of the wheelchair 1 as shown in FIG. 1, and is best understood when read in conjunction therewith. It is important to emphasize that although the present drawings show a single brake apparatus, the wheelchair brake of the present invention preferably includes one such apparatus proximate each rear wheel of the wheelchair, as shown in FIG. 3.

The seat actuation member 20 is a compressible cushion having an external surface 21 and an internal surface 22 defining a substantially enclosed first fluid cell 23 that has a predetermined volume. The seat actuation member 20 further includes a first (front) end 24 and an opposed second (back) end 25. When viewed from the right-hand side of the wheel chair as shown, the second end 25 of seat actuation member 20 is positioned on seat member 5 proximate the seat back panel 6. A conduit 30 in fluid communication with the fluid cell 23 is coupled to the second end 25 of the seat actuation member proximate a first end 31. The conduit 30 has a predetermined volume and extends from the first end 31 to an opposed second end 32 thereof which is in fluid communication with the brake actuating member 80, in the form of a second fluid cell (hereinafter "second fluid cell 80"). The second fluid cell 80 includes dual compartments 81 and 82 in fluid communication with one another and having a predetermined volume. In that manner, the first fluid cell 23, the conduit 30, and the fluid compartments 81 and 82 of the second fluid cell 80 together define a closed fluid system.

As shown, the second fluid cell 80 is positioned within the chamber 44 of connection mechanism 40 and interposed between one side of the internal surface of connection mechanism 40 and a surface 71 of plate member 70. That is, the top end 41 of the connection mechanism 40 is removable to facilitate insertion of the second fluid cell 80 within the chamber 44 when the brake apparatus is manufactured and assembled. This also facilitates removal and replacement of the second fluid cell 80 after market if repair or replacement is required. The top end 41 of the connection mechanism 40 includes an inlet (not shown) which permits the conduit 30 to pass from the external surface 42 (see FIG. 6) of the connection mechanism 40 to the chamber 44. Although it is not shown, the top end 41 can be secured to the remainder of the connection mechanism 40 using a simple screw, or a plurality of screws. The exact mode of securing the top end 41 to the connection mechanism 40 is not critical, and other acceptable methods of securing can be easily appreciated by those skilled in the art.

A pivot member 60 is rotatably coupled to an inner surface of the connection mechanism 40 within the chamber 44 thereof proximate the lower end 45 thereof. As shown in FIGS. 4 and 5, the pivot member 60 has a pivoting axis that runs along a direction perpendicular to the surface of the paper. Within the chamber 44, plate member 70 is attached to the pivot member 60 proximate a first end 73 along the pivoting axis and extends away from pivot member 60 toward an opposed second end 74 positioned proximate the first end 41 of connection mechanism 40.

The brake shaft member 90 is also coupled to a portion of pivot member 60 proximate first end 91 and extends away from pivot member 60 toward opposed second end 92. The brake shaft member passes from the chamber 44 through an opening 46 proximate the lower end 45 of the connection mechanism 40 and extends substantially downwardly therefrom. A friction member 95 is positioned proximate the second end 92 of the shaft member 90 and is adapted to contact the ground surface on which the wheelchair is located.

FIG. 4 also shows attachment members 50, 50 positioned on a portion of the external surface 42 of connection mechanism 40 to attach the connection mechanism 40 to the rear frame portion 2 of the wheelchair 1. As shown, the swivel-hinge attachment members 50, 50 each include a first clamp member 51, a second clamp member 56, and closure members 510. The preferred attachment members 50, 50 are described in further detail herein below.

FIG. 5 is a partial cut-away side-view of the brake apparatus of FIG. 4 shown in the disengaged mode of FIG. 2. FIG. 5 is discussed in more detail below in connection with the operation of the brake apparatus of the present invention.

Figure 6:
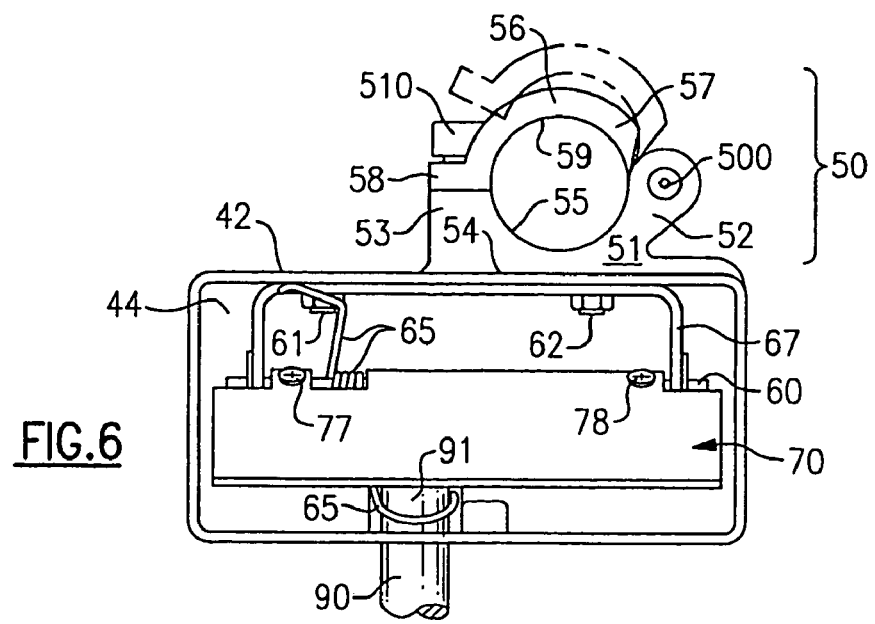
FIG. 6 is a top view of the connection mechanism as shown in FIGS. 1-5.

FIG. 6 is a top view of the connection mechanism and brake actuating member shown in FIGS. 4 and 5, and is best understood when read in connection therewith. Pivot member 60 is rotatably coupled to pivot-hinge member 67 which is fixed to an internal surface of the chamber 44 via pivot-hinge member fasteners 61 and 62. A biasing member 65 is coupled to a portion of pivot-hinge member 67, and wound about the pivoting axis of pivot member 60 (shown here as a longitudinally corresponding to the Cartesian x-axis). The biasing member 65 is further coupled to a portion of the brake shaft member 90 proximate the first end 91 thereof.

The plate member 70 is fixedly coupled to the pivot member 60 along (parallel to) the pivoting axis thereof via plate member fasteners 77 and 78. Brake shaft member 90 is fixedly coupled, i.e., welded or otherwise joined, to pivot member 60 and extends therefrom in an angular direction which is non-parallel to the pivoting axis of pivot member 60. The brake shaft member 90 passes from chamber 44 through opening 46 to extend away from the connection mechanism 40.

Pivot member 60 can also include a stop member (not shown), which prevents excess rotation of pivot member 60. The stop member can be a set-screw attached to a side portion of the pivot member 60 opposing the position where brake shaft member 90 is attached. As pivot member 60 rotates, the stop member contacts a portion of the inner surface of chamber 44 to stop excess rotation of brake shaft member 90. Alternatively, the opening 46 in the bottom end 45 of connection mechanism 40 can also be dimensioned to provide rotation control (stop) for brake shaft member 90 passing therethrough. In that manner, the size and shape of opening 46 allows brake shaft member 90 to rotate in response to the rotation of pivot member 60 only until the brake shaft member 90 contacts the peripheral edge of opening 46 and further motion is prevented.

Attachment member 50 is shown as a swivel hinge having a first clamp member 51 having a hinged side 52, an opposed non-hinged side 53, a front surface 55 and a back surface 54. The back surface 54 is fixedly fastened to the external surface 42 of connection mechanism 40 via welding for example. Attachment member 50 also includes a second clamp member 56 having a hinged side 57, an opposed non-hinged side 58, a front surface and a back surface 59. The second clamp member 56 is positioned such that the back surface 59 opposes the front surface 55 of the first clamp member 51, and the non-hinged sides 53 and 58 of the first and said second clamp members oppose one another.

The hinged sides 52 and 57 of the first and second clamp members 51 and 56 are joined to one another via swivel member 500, which acts as the pivot point for the hinge. That is, the second clamp member 56 can rotate about the swivel member such that the non-hinged side 58 can move into and out of proximity with the non-hinged side 53 of the first clamp member 51. The front surface 55 of the first clamp member 51 and the back surface 59 of the second clamp member are curved or otherwise shaped to define an opening therebetween, even when the non-hinged sides 53 and 58 contact one another. The exact shape of the opening defined by the front surface 55 of the first clamp member 51 and the back surface 59 of the second clamp member is not critical, so long as it is sufficient to receive and substantially retain a portion of the wheelchair frame 2 to secure the connection mechanism 40 thereto. Closure member 510 is provided proximate the non-hinged sides 53 and 58 of the first and second clamp members to prevent the second clamp member 56 from swinging freely about the swivel member 500. The closure member 510 further keeps the non-hinged sides 53 and 58 in a desired proximity to one another to firmly maintain the position of the connection mechanism 40 on the wheelchair frame interposed between the clamp members. The closure member 510 can be a screw, carriage bolt, or similar fastening member.

As can be appreciated from the foregoing description, the connection mechanism 40 described above is a single enclosed unit that can be easily attached to a wheelchair frame by one person using a single tool, making installation of the brake apparatus simple and fast. First, the connection mechanism 40 is positioned on a portion of the rear frame 2 beneath the axle 3, such that the front surface 55 of the first clamp member 51 is in contact with the frame 2. The connection mechanism 40 is then vertically aligned with the frame 2, and slidably positioned until the friction member 95 is brought into proper contact with the ground surface on which the wheelchair 1 is located. The second clamp member 56 is then swiveled into a closed position around the frame such that the non-hinged side 58 comes into proximity with the non-hinged side 53 of the first clamp member 51. The closure member 510 is inserted into a coupling bore (not shown), and tightened such that the second clamp member 56 is clamped about the frame 2, and the non-hinged side of the attachment member 50 is secured to firmly attach the connection mechanism 40 to the frame 2. The seat actuation member 20 is passed through an opening between the seat member 5 and the seat back panel 6 and placed on seat member 5 (e.g., using an adhesive). Installation is now complete.

It should be noted that although the above descriptions relate to a single connection mechanism, two are preferably included in various embodiments of the present invention. That is, the present invention preferably includes one of the above-described connection mechanisms and brake members for each rear wheel of the wheelchair.

Once the brake apparatus has been properly installed, an unoccupied wheelchair thusly equipped is automatically braked and primed for use. In operation, the friction members 95 (on each side of the wheelchair frame as shown in FIG. 3) are in the first position in substantial contact with the surface on which the wheelchair is sitting, and the seat actuation member 20 is in a deactivated state on seat member 5. Each of the friction members 95 are held in this first position under resting spring tension from a corresponding biasing member 65 (see FIG. 6). While the automatic brake is engaged, the wheelchair 1 is immobilized against rearward motion. As a potential occupant attempts to sit in the seat member 5, the natural rearward forces communicated onto the wheelchair 1 do not cause the wheelchair 1 to roll backward, and the wheelchair remains stable and stationary during occupational ingress.

Further operation of the brake apparatus of the present invention is described with reference to FIGS. 5 and 6. When no external pressure is applied to the closed system described above, such as when the wheelchair seat member 5 is unoccupied and the brake is engaged as shown in FIGS. 1 and 4, the closed system is in an equilibrium, or resting, state. This equilibrium state also applies to a fluid, such as air, contained within the closed system. Preferably, the seat actuation member 20 has a volume such that it remains somewhat inflated by the fluid present in the closed system, and the second fluid cell 80 has a volume such that the dual compartments 81 and 82 are substantially collapsed (i.e., not filled to their maximum volumetric capacity) in the resting equilibrium state.

However, when an occupant assumes a seated position, as shown in FIG. 2 and represented by the arrows above seat actuation member 20 in FIG. 5, the seat actuation member 20 compresses under the sitting pressure and the volume of fluid cell 23 is reduced. This upsets the resting equilibrium of the closed system, and to compensate, the fluid present in the fluid cell 23 is translocated via the conduit 30 to the second fluid cell 80 and into compartments 81 and 82. That is, the pressure on the first fluid cell 23 forces the fluid present therein to flow through the closed system to an area that can accommodate the fluid and reestablish a pressure equilibrium, such as the second fluid cell 80.

When the compartments 81 and 82 of the second fluid cell 80 expand as shown by the arrow in FIG. 5 to accommodate the increased volume of fluid, mechanical pressure (force) is applied to surface 71 of plate member 70 within chamber 44. Plate 70 is fixedly coupled to the pivot member 60 via plate fasteners 77 and 78, as described above and shown in FIG. 6, and when the force exerted on plate member 70 overcomes the spring constant of biasing member 65, pivot member 60 rotates (clockwise as shown) and plate member 70 rotates in concert. Further, because brake shaft member 90 is also fixedly coupled to pivot member 60 as described above, the rotational force created by the movement of pivot member 60 and plate 70 also translates to brake shaft member 90, causing brake shaft member 90 to rotate in concert as well.

As brake shaft member 90 moves in an upward and outward arcuate direction (clockwise as shown), friction member 95 moves out of the first position and into the second position spaced a distance above the ground. The brake apparatus is then in a disengaged state, as shown in FIGS. 2 and 5.

While the occupant or object continues to apply pressure to the seat actuation member 20, the brake apparatus remains disengaged. As the occupant rises, the sitting pressure on the seat actuation member 20 is removed, the pressure on the closed system is reduced, and the fluid cell 23 can again accommodate an increased volume of fluid. As fluid translocates from the second fluid cell 80 back toward the seat actuation member 20 via the conduit 30, the dual chambers 81 and 82 contract to their resting, un-inflated states. Pressure is removed from the plate 70, which rotates counterclockwise with pivot member 60 in response to the release of force and under the influence of biasing member 65. Simultaneously, the brake shaft member 90 also rotates with the pivot member 60, such that the friction member 95 also moves downward along the predetermined arc and back into the first position in substantial contact with the ground surface on which the wheelchair is located, where it remains under resting bias tension from biasing member 65. With the brake apparatus engaged once again, the wheelchair is situated to provide stable support for an occupant as they attempt to enter the seat member 5 thereof.

Figure 7:
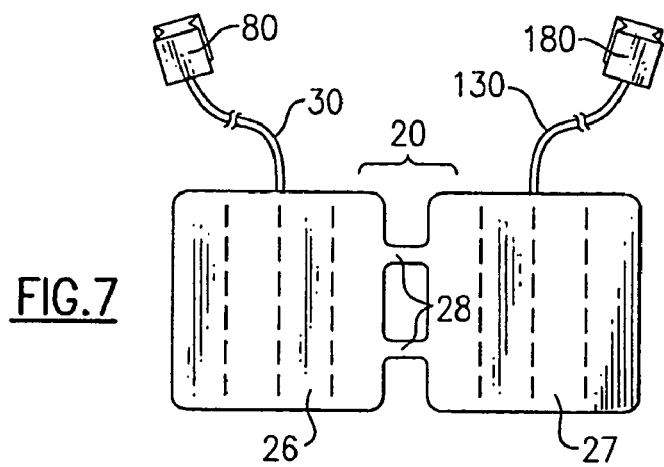
FIG. 7 is a schematic view showing a seat actuation member, conduits and second fluid cells according to one embodiment of the present invention.
Figure 8:
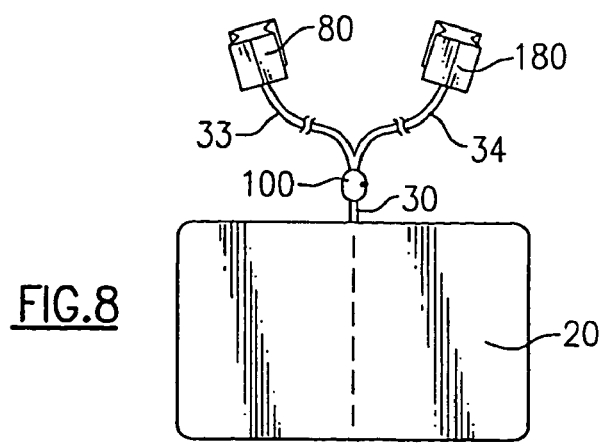
FIG. 8 is a schematic view showing a seat actuation member, conduit and second fluid cells according to another embodiment of the present invention.

FIGS. 7 and 8 are schematic views showing seat actuation members, conduits and brake actuating fluid cells according to various embodiments of the present invention. FIG. 7 shows a seat actuation member 20 having a plurality of sections 26 and 27 connected by transverse passages 28. Each of the sections 26, 27 and passages 28 are in fluid communication with one another. Further, section 26 is in fluid communication with the second fluid cell 80 via a first conduit 30, and section 27 is in fluid communication with another second fluid cell 180 via a second conduit 130. Together, the seat actuation member 20, the conduits 30 and 130, and the second fluid cells 80 and 180 define a closed fluid system. It should be clear from the foregoing that this embodiment could easily be incorporated into the brake apparatus shown in FIG. 3 by inserting the second fluid cells 80 and 180 into the chamber of a respective connection mechanism 40.

FIG. 8 shows a seat actuation member 20 in fluid communication with a plurality of second fluid cells 80, 180 via a conduit 30 having branches 33 and 34. Together, the seat actuation member 20, the conduits 30, 33 and 34, and the plurality of second fluid cells 80 and 180 define a closed fluid system. A pressure regulating member 100 is positioned on a portion of the conduit 30 and interposed between the seat actuation member 20 and the position where conduit 30 is divided into branch conduits 33 and 34. As shown, the pressure regulating member 100 is a bulb-member having a one way check valve. The pressure regulating member 100 allows a technician to adjust the pressure within the closed system to facilitate proper operation of the automatic brake apparatus. Manual pressure regulation can be helpful in maintaining the system, and can help to compensate for the varying weights of patients who may use a single wheelchair equipped with the brake apparatus of the present invention.

Figure 9:
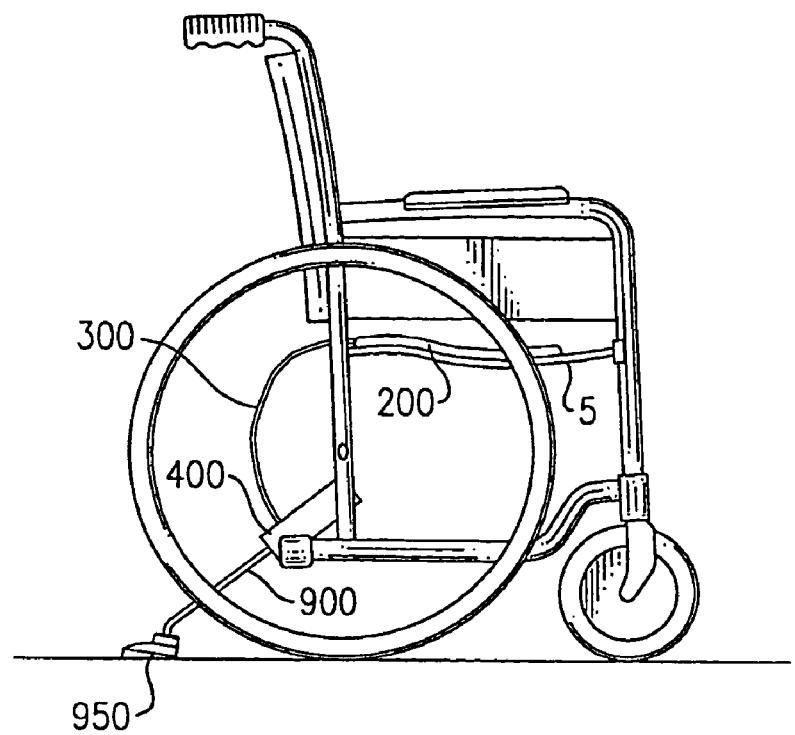
FIG. 9 is a side view showing another embodiment of a wheelchair and brake apparatus according to the present invention.
Figure 10:
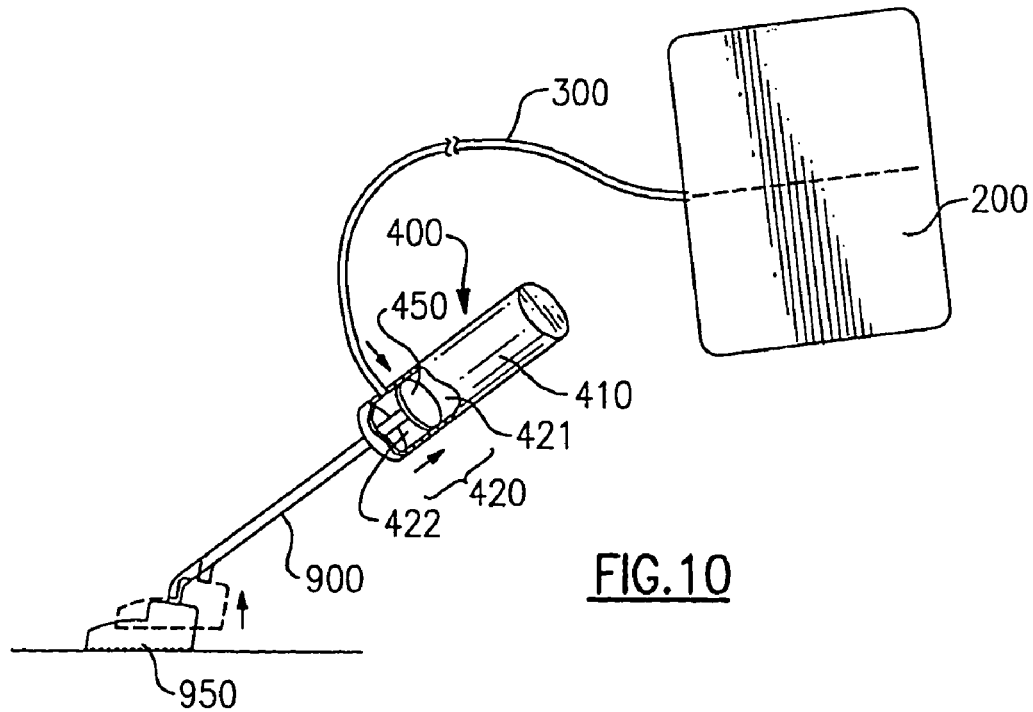
FIG. 10 is a partial cut away side view showing the brake apparatus of FIG. 9.

FIG. 9 is a side view of a wheelchair equipped with a brake apparatus according to another embodiment of the present invention, and FIG. 10 is a partial cut-away side view of the brake apparatus shown in FIG. 9. The seat actuation member 200 is in fluid communication with brake actuating member 400 via a conduit 300 defining a closed fluid system. The brake actuating member 400 includes a cylindrical housing 410 having an external surface and an internal surface defining a chamber 420. Piston member 450 is positioned with chamber 420 and substantially divides chamber 420 into two separate chambers 421 and 422. Chamber 422 is in fluid communication with the conduit 300 and the seat actuation member 200 as part of the aforementioned closed fluid system. Piston member 250 further includes a fixedly coupled shaft member 900 extending downwardly therefrom and beyond the cylindrical housing 410, such that friction member 950 positioned on a terminal end of shaft member 900 is in a first position in substantial contact with a surface on which the wheelchair is located.

When a person or an object exerts a pressure force on the seat actuation member 200 as described above, fluid therewithin is translocated to chamber 422 via conduit 300. The increase in pressure within chamber 422 caused by the increased fluid volume exerts a force on piston member 250, which moves (upward as shown) in response and increases the volume of chamber 422 to accommodate the increased fluid volume. When the piston member 250 moves, the shaft member 900 also moves in a similar direction, which causes friction member 950 to assume a second position spaced a distance above the surface on which the wheelchair is located. The brake apparatus of this embodiment is thusly disengaged. When the person or object vacates the seat member 5, pressure is removed from the seat actuation member 200, which reestablishes the original equilibrium of the fluid system, and allows the excess fluid in chamber 422 to return to the seat actuation member 200 via the conduit 300. The decrease in fluid volume in chamber 422 causes the piston member 450 to move downward and return to its initial position such that the shaft member 900 also moves down and the friction member 950 is again placed in the first position. The brake apparatus of this embodiment is thusly reengaged upon occupational egress. A spring (not shown) could be positioned in chamber 421 to bias piston 450 in a downward direction.

Figure 11:
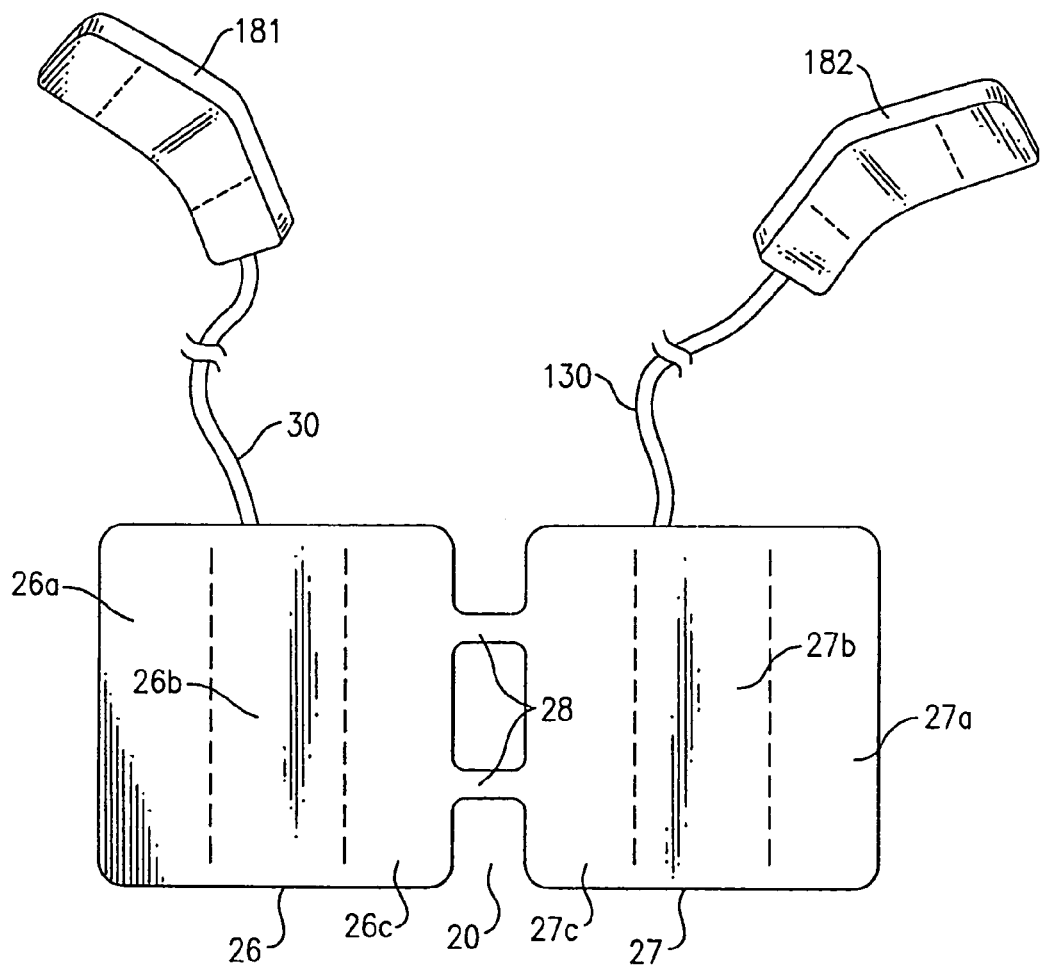
FIG. 11 is a schematic view showing a seat actuation member, conduits, and second fluid cells according to another embodiment of the present invention.

FIG. 11 shows a seat actuation member 20 having sections 26 and 27 connected by transverse passages 28, which is similar to the seat actuation member 20 described above in connection with FIG. 7. Each of the sections 26, 27 and passages 28 are in fluid communication with one another. As shown, section 26 is partitioned into a plurality of juxtaposed, adjacent fluid chambers 26a, 26b and 26c that are in fluid communication with each other, and section 27 is likewise partitioned into a plurality of juxtaposed, adjacent fluid chambers 27a, 27b and 27c that are in fluid communication with each other. Further, section 26 is in fluid communication with the second fluid cell 181 via a first conduit 30, and section 27 is in fluid communication with another second fluid cell 182 via a second conduit 130. It should be noted that section 26 is also in fluid communication with the second conduit 130 and the second fluid cell 182 by virtue of its communication with the transverse passages 28 and section 27. Likewise, section 27 is also in fluid communication with first conduit 30 and the second fluid cell 181 by virtue of its communication with the transverse passages 28 and section 26.

Together, the partitioned seat actuation member 20, the conduits 30 and 130, and the second fluid cells 181 and 182 define a closed fluid system. According to this embodiment, the second fluid cells 181 and 182 each comprise a flexible, elongate fluid chamber that is foldably arranged generally in the shape of bellows when this embodiment is incorporated into the connection mechanism 40 of the brake apparatus of the present invention, as shown in FIGS. 12A and 12B.

Figure 12A:
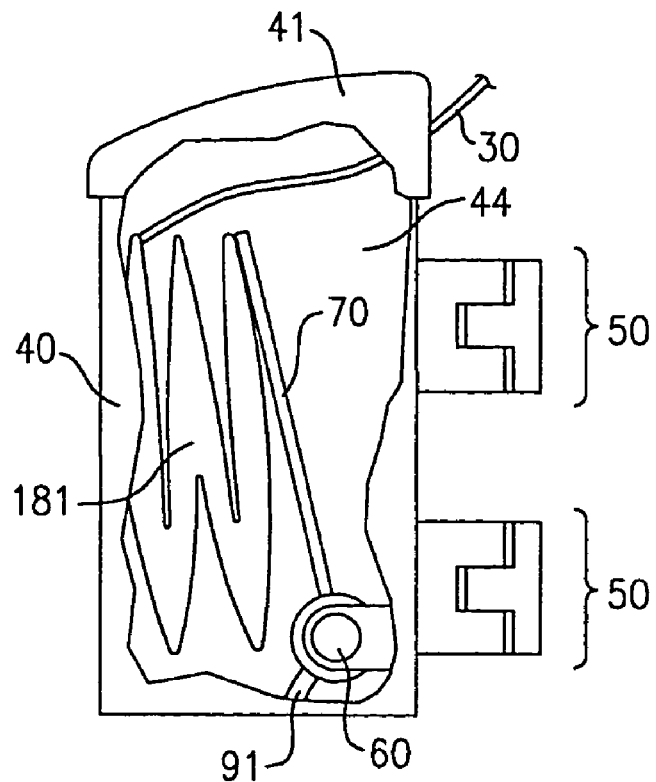
FIG. 12A is a partial cut-away side view of one embodiment of a connection mechanism of the brake apparatus according to the present invention including the conduit 30 and second fluid cell 181 of FIG. 11, shown in an engaged mode.

FIG. 12A shows a partial cut-away side view of a connection mechanism 40 according to the present invention, including the second fluid cell 181 of FIG. 11 positioned within chamber 44. When no external pressure is applied to the closed system shown in FIG. 11, the closed system is in an equilibrium, or resting, state. Preferably, the each of the sections 26, 27 and passages 28 of the seat actuation member 20 have a volume such that the seat actuation member 20 remains somewhat inflated by the fluid present in the closed system in the resting equilibrium state, and the second fluid cells 181 and 182 have a volume such that the folded portions are substantially collapsed in close juxtaposition (i.e., not filled to their maximum volumetric capacity) in the resting equilibrium state. As shown in FIG. 12A, the collapsed, folded portions of the second fluid cell 181 resemble a letter "W" in the resting state while the brake apparatus is in an engaged mode, similar to the mode shown in FIG. 4.

Figure 12B:
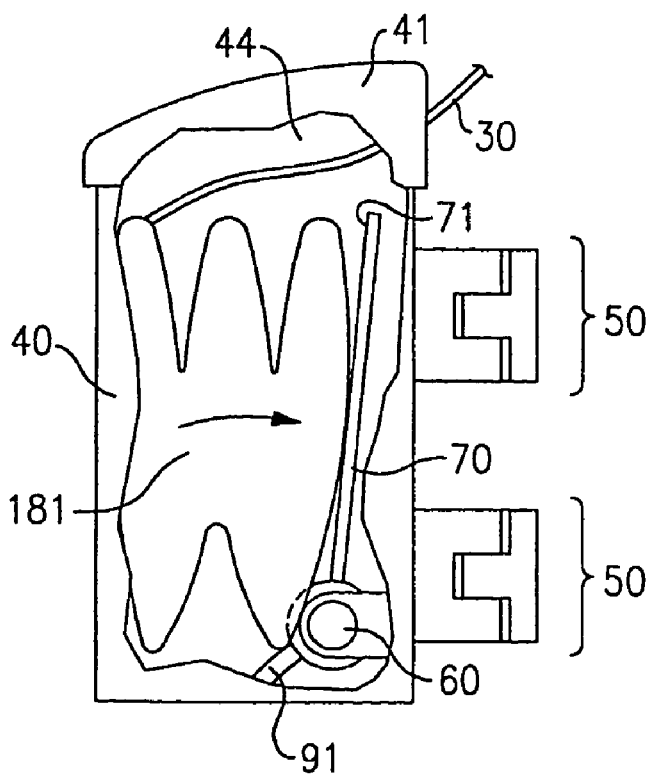
FIG. 12B is a partial cut-away side view of the apparatus of FIG. 12A shown in a disengaged mode.
Figure 13:
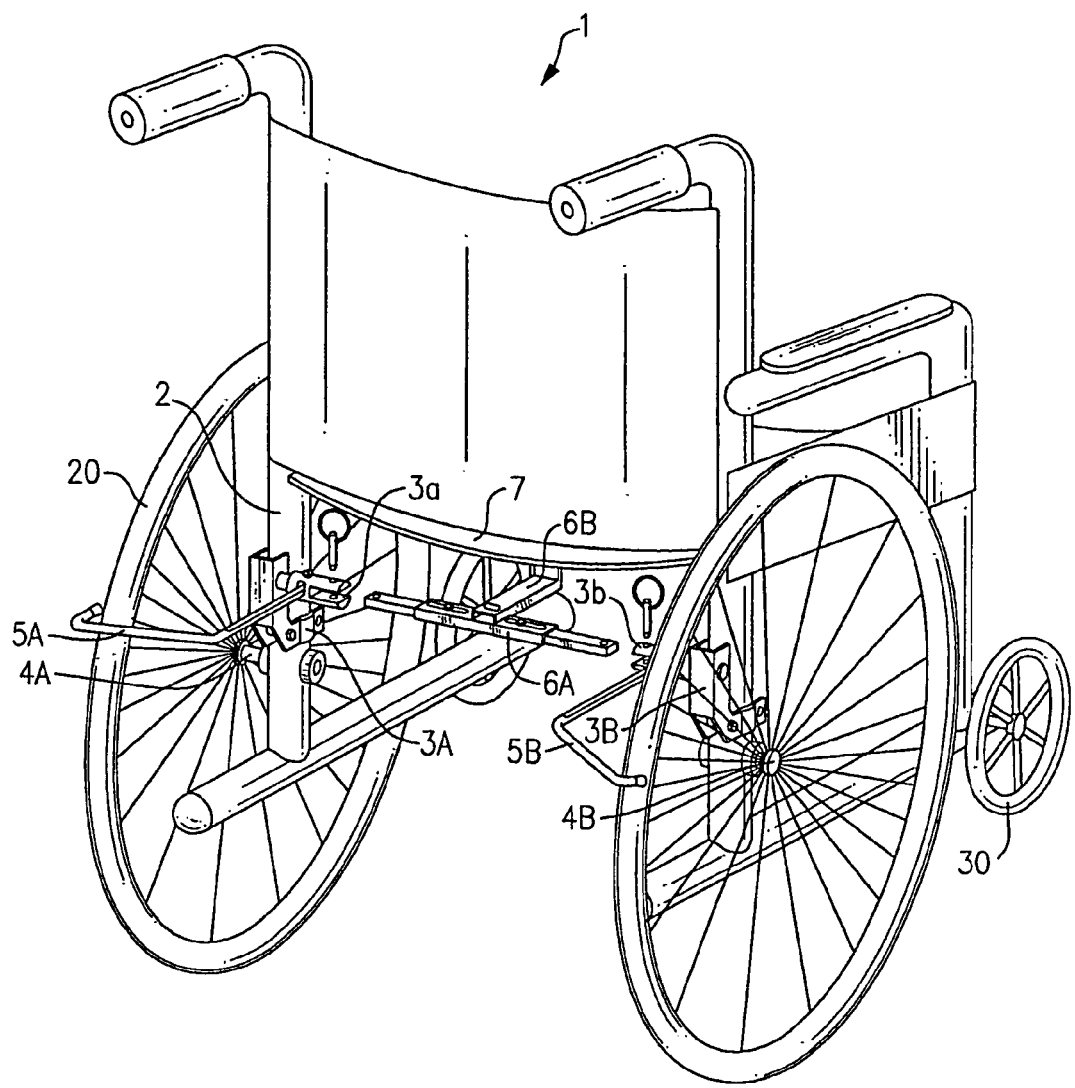
FIG. 13 is a perspective view of a wheelchair having a prior art braking assembly attached thereto.
Figure 14:
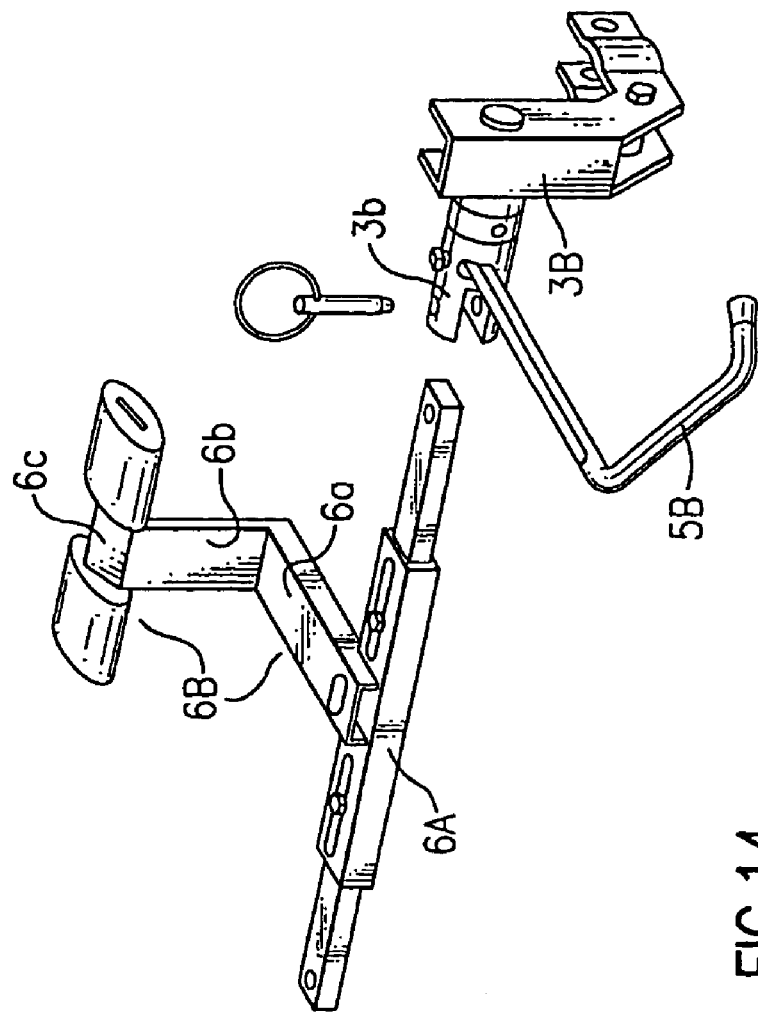
FIG. 14 is an assembly view of the multiple components required for the prior art braking assembly of FIG. 13.

FIG. 12B shows the brake apparatus of FIG. 12A in a disengaged mode. The partial cut-away side view shows the mechanical effects that occur when an occupant assumes a seated position in the wheelchair, as shown in FIG. 2, for example. As described above in connection with FIG. 5, the seat actuation member 20 of FIG. 11 compresses under the sitting pressure and the volume of fluid chambers 26 and 27 are reduced. This pressure on the fluid chambers 26 and 27 of the seat actuation member 20 forces the fluid present therein to flow through the closed system to the second fluid cells 181 and 182 of FIG. 11.

When the collapsed, folded sections of the second fluid cell 181 shown in FIG. 12A expand as shown by the arrow in FIG. 12B to accommodate the increased volume of fluid, mechanical pressure (force) is applied to surface 71 of plate member 70 within chamber 44. The mechanical effects of the expansion of the second fluid cell 181 are similar to those described above in connection with FIG. 5, and ultimately, the brake apparatus assumes a disengaged state, as shown in the expanded views of FIGS. 2 and 5.

It should be noted that seat actuation members having a plurality of interconnected fluid chambers, such as those shown in FIG. 7 and FIG. 11, are preferred. Field testing has shown that compartmentalizing the fluid chambers within the seat actuation member 20 actually provides more uniform actuation of the brake apparatus on both sides of the wheelchair, even when the occupant is petite or tends to lean toward one side. The partitioned fluid chambers distribute the fluid pressure in a more uniform manner, such that when slight or uneven pressures are applied, the volumetric changes of the fluid in the seat actuation member are uniformly transmitted to both conduits and ultimately, the plurality of second fluid chambers provided at the other end of the closed fluid system.

The embodiments shown in FIGS. 7 and 11 are also easier to fold across the transverse passage sections 28 when the wheelchair is collapsed for storage or transport.

While the present invention has been particularly shown and described with reference to the preferred mode as illustrated in the drawings, it will be understood by one skilled in the art that various changes may be effected therein without departing from the spirit and the scope of the invention as defined by the claims.

We claim:

1. An automatically engageable and releasable brake apparatus adaptable to be attached to a wheelchair, said brake apparatus comprising:
   a connection mechanism adapted to be positioned on a portion of the wheelchair frame;
   a seat actuation member adapted to be positioned in communication with a seat of the wheelchair, said seat actuation member comprising a first fluid cell having a first volume and including a plurality of fluid chambers in fluid communication with one another;
   a brake actuating member in fluid communication with said seat actuation member defining a closed fluid system therewith, said brake actuating member being positioned within said connection mechanism, said brake actuating member comprising a second fluid cell having a second volume, wherein said first fluid cell is in fluid communication with said second fluid cell via a conduit having a third volume, and wherein said first fluid cell, said second fluid cell and said conduit define said closed fluid system; and
   a brake member adapted to contact a ground surface on which the wheelchair is located, said brake member being coupled to said connection mechanism,
   wherein a volume of fluid in said closed fluid system is less than a total volume of said closed fluid system, and wherein occupational ingress into the wheelchair actuates said seat actuation member to cause fluid flow from said seat actuation member to said brake actuating member, which actuates said brake actuating member and causes said brake member to move from a first position in substantial contact with the ground surface on which the wheelchair is located to a second position spaced a distance above the ground surface.

2. The brake apparatus of claim 1, wherein said brake member comprises:
   a brake shaft member in communication with said brake actuating member, said brake shaft member extending from a first end thereof to an opposed second end thereof, and positioned to extend substantially downwardly from a portion of said connection mechanism proximate said first end of said brake shaft member; and
   a friction member positioned proximate said second end of said brake shaft member and adapted to contact a surface on which the wheelchair is located.

3. The brake apparatus of claim 1, further comprising a pivot member having a pivot axis and a plate member attached to said pivot member, wherein said pivot member is rotatably coupled to at least one inner surface of said connection mechanism and cooperates with said brake actuating member to move said brake member.

4. The brake apparatus of claim 3, wherein said second fluid cell is positioned within said connection mechanism between a surface of said plate member and a portion of an internal surface of said connection mechanism.

5. The brake apparatus of claim 4, wherein said brake actuating member includes a brake shaft member having a first end coupled to a portion of said pivot member, such that said plate member and said brake shaft member rotate about said pivot member in concert.

6. The brake apparatus of claim 3, further comprising at least one biasing member operatively coupled to said pivot member to bias said pivot member in a first rotation direction toward said first position.

7. The brake apparatus of claim 1, wherein said second fluid cell comprises a plurality of fluid chambers in fluid communication with one another.

8. The brake apparatus of claim 7, wherein said plurality of fluid chambers of said second fluid cell are foldably stacked on one another.

9. The brake apparatus of claim 1, wherein said conduit comprises a plurality of branch conduits and wherein said branch conduits are in fluid communication with a corresponding plurality of second fluid cells to define a closed system.

10. An automatically engageable and releasable brake apparatus adaptable to be attached to a wheelchair, said brake apparatus comprising:
a connection mechanism adapted to be attached to a portion of a frame of the wheelchair;
a seat actuation member adapted to be positioned in communication with a seat of the wheelchair, said seat actuation member comprising a first fluid cell having a first volume and including a plurality of fluid chambers in fluid communication with one another;
a brake actuating member in fluid communication with said seat actuation member and defining a closed fluid system therewith, said brake actuating member comprising a second fluid cell having a second volume, wherein said first fluid cell is in fluid communication with said second fluid cell via a conduit having a third volume, and wherein said first fluid cell, said second fluid cell and said conduit define said closed fluid system;
a brake shaft member in communication with said brake actuating member, said brake shaft member extending from a first end thereof to an opposed second end thereof, and positioned to extend substantially downwardly from a portion of said connection mechanism proximate said first end of said shaft member; and
a friction member positioned proximate said second end of said brake shaft member and adapted to contact a surface on which the wheelchair is located;
wherein a volume of fluid in said closed fluid system is less than a total volume of said closed fluid system, and wherein occupational ingress into the wheelchair actuates said seat actuation member to cause fluid flow from said seat actuation member to said brake actuating member, which actuates said brake actuating member and causes said brake shaft member to move such that said friction member substantially contemporaneously moves from a first position in substantial contact with the surface on which the wheelchair is located to a second position spaced a distance above the surface on which the wheelchair is located.

11. The brake apparatus of claim 10, wherein said brake actuating member further comprises a pivot member having a pivot axis, and a plate member attached to said pivot member, wherein said pivot member is rotatably coupled to at least one inner surface of said connection mechanism and cooperates with said brake actuating member to move said brake member.

12. The brake apparatus of claim 11, wherein further comprising at least one biasing member operatively coupled to said pivot member to bias said pivot member in a first rotation direction toward said first position.

13. The brake apparatus of claim 10, wherein said second fluid cell is positioned within said connection mechanism between a surface of said plate member and a portion of an internal surface of said connection mechanism.

14. The brake apparatus of claim 13, wherein said first end of said brake shaft member is coupled to a portion of said pivot member, such that said plate member and said brake shaft member rotate about said pivot member in concert.

15. An automatically engageable and releasable brake apparatus adaptable to be attached to a wheelchair, said brake apparatus comprising:
a seat actuation member comprising a first fluid cell having a first volume and including a plurality of fluid chambers in fluid communication with one another;
a brake actuating member in fluid communication with said seat actuation member and defining a closed fluid system therewith, said brake actuating member comprising a second fluid cell having a second volume, wherein said first fluid cell is in fluid communication with said second fluid cell via a conduit having a third volume, and wherein said first fluid cell, said second fluid cell and said conduit define said closed fluid system; and
a brake member in communication with said brake actuating member;
wherein actuation of said seat actuation member activates said brake actuating member which causes said brake member to move from a first position which prevents any significant rearward motion of the wheelchair to a second position which allows substantially unrestricted rearward motion of the wheelchair.

16. A wheelchair comprising:
a frame;
a seat member incorporated into and substantially supported by said frame;
a wheel assembly having a plurality of first wheels rotatably connected proximate a front end of said frame, and a plurality of second wheels rotatably connected proximate a rear portion of said frame; and
an automatically engageable and releasable brake apparatus attached to said rear portion of said frame, said brake apparatus comprising:
a seat actuation member comprising a first fluid cell having a first volume and including a plurality of fluid chambers in fluid communication with one another,
a brake actuating member in fluid communication with said seat actuation member and defining a closed fluid system therewith, said brake actuating member comprising a second fluid cell having a second volume, wherein said first fluid cell is in fluid communication with said second fluid cell via a conduit having a third volume, and wherein said first fluid cell, said second fluid cell and said conduit define said closed fluid system, and
a brake member in communication with said brake actuating member;
wherein actuation of said seat actuation member activates said brake actuating member which causes said brake member to move from a first position which prevents any significant rearward motion of said wheelchair to a second position which allows substantially unrestricted rearward motion of said wheelchair.

* * * * *